(12) United States Patent
Sun

(10) Patent No.: US 10,659,231 B2
(45) Date of Patent: May 19, 2020

(54) IDENTITY AUTHENTICATION USING A WEARABLE DEVICE

(71) Applicant: Alibaba Group Holding Limited, George Town (KY)

(72) Inventor: Yuanbo Sun, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 166 days.

(21) Appl. No.: 15/920,087

(22) Filed: Mar. 13, 2018

(65) Prior Publication Data

US 2018/0205557 A1 Jul. 19, 2018

Related U.S. Application Data

(63) Continuation of application No. PCT/CN2016/097999, filed on Sep. 5, 2016.

(30) Foreign Application Priority Data

Sep. 14, 2015 (CN) .......................... 2015 1 0583968

(51) Int. Cl.
*H04L 9/32* (2006.01)
*H04W 12/06* (2009.01)
(Continued)

(52) U.S. Cl.
CPC ....... *H04L 9/3247* (2013.01); *G06Q 20/3223* (2013.01); *G06Q 20/3825* (2013.01);
(Continued)

(58) Field of Classification Search
CPC ..... H04L 9/3247; H04L 9/32; H04L 63/0823; H04L 63/0876; H04L 63/0853;
(Continued)

(56) References Cited

U.S. PATENT DOCUMENTS

2003/0046541 A1* 3/2003 Gerdes .................... G06F 21/31
713/168
2005/0101295 A1* 5/2005 Rupp ..................... G06Q 20/04
455/411
(Continued)

FOREIGN PATENT DOCUMENTS

CN 101616002 12/2009
CN 101655916 2/2010
(Continued)

OTHER PUBLICATIONS

Singaporean Search Report in Singaporean Patent Application No. 11201801610P, dated Jan. 14, 2019, 9 pages.
(Continued)

*Primary Examiner* — Trong H Nguyen
(74) *Attorney, Agent, or Firm* — Fish & Richardson P.C.

(57) ABSTRACT

A wearable device transmits a service request generated by the wearable device to a server, where the service request is associated to a service application type. The wearable device receives an identity authentication request message associated to the service application type from the server using a preset standard interface. The wearable device verifies a signature in the identity authentication request message according to a public key of the service application type. In response to verifying the signature, the wearable device retrieves service authentication information of an account corresponding to the identity authentication request message from a locally pre-stored service authentication information database. The wearable device transmits a verification response message comprising the acquired service authentication information to the server using the preset standard interface.

14 Claims, 4 Drawing Sheets

(51) Int. Cl.
*G06Q 20/38* (2012.01)
*H04L 29/06* (2006.01)
*G06Q 20/32* (2012.01)

(52) U.S. Cl.
CPC ............ *H04L 9/32* (2013.01); *H04L 63/0823* (2013.01); *H04L 63/0853* (2013.01); *H04L 63/0876* (2013.01); *H04L 63/123* (2013.01); *H04W 12/06* (2013.01); *H04L 2209/80* (2013.01)

(58) Field of Classification Search
CPC . H04L 63/123; H04L 2209/80; H04L 9/0866; G06Q 20/3825; G06Q 20/40; G06Q 20/3223; H04W 12/06
See application file for complete search history.

(56) References Cited

U.S. PATENT DOCUMENTS

| | | | |
|---|---|---|---|
| 2007/0028109 A1* | 2/2007 | Wysocki | G06Q 20/3678 713/176 |
| 2007/0245148 A1* | 10/2007 | Buer | H04L 9/3271 713/182 |
| 2007/0263710 A1 | 11/2007 | Kasslin et al. | |
| 2013/0054960 A1* | 2/2013 | Grab | H04L 63/168 713/155 |
| 2013/0276080 A1 | 10/2013 | Nakonetzki et al. | |
| 2013/0311373 A1* | 11/2013 | Han | G06Q 20/3278 705/44 |
| 2013/0340048 A1 | 12/2013 | Sebastian et al. | |
| 2014/0189779 A1* | 7/2014 | Baghdasaryan | H04L 63/08 726/1 |
| 2016/0028707 A1* | 1/2016 | Feng | H04L 63/0807 726/9 |
| 2016/0219043 A1* | 7/2016 | Blanke | H04L 9/3263 |

FOREIGN PATENT DOCUMENTS

| | | |
|---|---|---|
| CN | 103310142 | 9/2013 |
| CN | 104063791 | 9/2014 |
| CN | 104331796 | 2/2015 |
| CN | 205725829 | 11/2016 |
| DE | 102012103106 | 10/2013 |
| EP | 2651097 | 10/2013 |
| JP | 2012038127 | 2/2012 |
| JP | 2014149561 | 8/2014 |
| KR | 20020081214 | 10/2002 |
| KR | 20150014788 | 2/2015 |
| WO | WO 2016150154 | 9/2016 |

OTHER PUBLICATIONS

Extended European Search Report issued in EP Application No. 16845653.1 dated Jul. 18, 2018; 9 pages.
International Search Report by the International Searching Authority issued in International Application No. PCT/CN2016/097999 dated Nov. 30, 2916; 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/097999, dated Mar. 20, 2018, 10 pages (with English translation).
KS X ISO/IEC 9798-3, "Information Technology-Security Technology-Entity Authentication vol. 3: Mechanism by Digital Signature Technique", Nov. 2008, 26 pages (with English machine translation).
KS X ISO 15782-1, "Management of Certificate for Financial Services vol. 1: Public Key Certificate," Sep. 2007, 10 pages (with English translation).

* cited by examiner

IDENTITY AUTHENTICATION USING A WEARABLE DEVICE

The application is a continuation of PCT Application No. PCT/CN2016/097999, filed on Sep. 5, 2016, which claims priority to Chinese Patent Application No. 201510583968.6, filed on Sep. 14, 2015, and each application is hereby incorporated by reference in its entirety.

BACKGROUND

Payment authentication is a type of identity authentication that can include the process of determining legitimacy of a fund transfer-related payment requested by a user through a wearable device. As related to a financial account, such identity authentication is particularly challenging in terms of security and convenience. In some cases, a mobile terminal is bound to the wearable device and is configured to receive and process the payment authentication request. The wearable device may only be configured to generate the authentication request and to display the results of the identity (and payment) authentication. Limiting the ability of the user to provide input associated to the processing of the authentication request can lead to a weak sense of participation in the payment process. Additionally, processing the payment authentication on the mobile terminal can be associated with low security, which can affect the payment success rate.

SUMMARY

Implementations of the present disclosure include computer-implemented methods for performing a service operation.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, if executed by the one or more computers, perform the computer-implemented method/the computer-readable instructions stored on the non-transitory, computer-readable medium.

The subject matter described in the specification can be implemented in particular implementations, so as to realize one or more of the following advantages. The implementations of the present disclosure include a method and a system for identity authentication. The identity authentication can include performing security verification operations by a user device and transmitting the authentication information to a server for subsequent processing in response to a successful verification. The implementations of the present disclosure increase the security of the identity authentication process and enhance a user's sense of participation in the verification process. The user device can be a wearable device including a graphical user interface configured to enable the user to interact with the wearable device during an identity authentication process, such as a payment authentication process. Transmitted information is based on format matching, which can effectively filter out an information exchange process of a service application from another type. The format based filtering can prevent other information from interfering with an information exchange process of the service application. The format based filtering can improve corresponding information processing efficiency, while reducing computing resources by minimizing the amount of transmitted data during the identity authentication process.

The details of one or more implementations of the subject matter of the specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes performing an authentication operation, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art can be omitted so as to not obscure one or more described implementations. The present disclosure is not intended to be limited to the described or illustrated implementations, but to be accorded the widest scope consistent with the described principles and features.

Online transaction risks can include account theft. Wearable devices usually enable payment operations using pre-stored data without requesting the user to provide authentication information to the wearable device. Many users avoid using wearable devices for payment operations due to the lack of control during authentication methods. Additionally, account thieves can forge pre-stored information to purchase real goods, virtual commodities, and the like or to transfer at least a portion of the balance to an account or a card by means of fast sign-up payment or non-deposit payment. Enabling the user of the wearable device to provide a user input for authentication identification increases the security of the process and the sense of control of the user.

Figure 1:
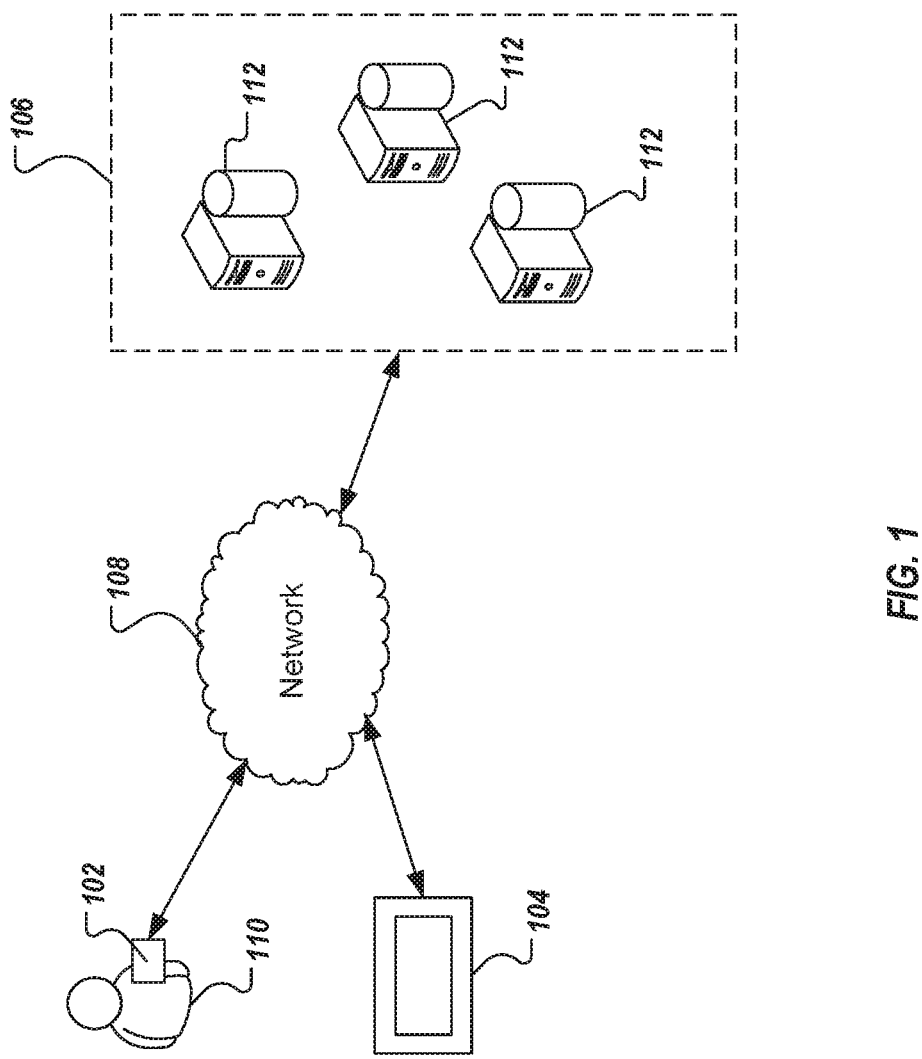
FIG. 1 is a block diagram illustrating an example of a system, according to an implementation of the present disclosure.

FIG. 1 depicts an example of a system 100 that can be used to execute implementations of the present disclosure. The example system 100 includes one or more user devices 102, a terminal device 104, a server system 106, and a network 108. The user device 102, the terminal device 104, and the server system 106 can communicate with each other over the network 108. The server system 106 includes one or more server devices 112.

The user 110 can interact with the user device 102. In an example context, the user 110 can interact with a software application (or "application"), such as an authentication application, installed on the user device 102 that is hosted by the server system 106. The user device 102 can be a wearable device, such as a smart watch, a smart badge, or smart glasses. The user device 102 can include a plurality of components, as described in detail with reference to FIG. 2. The user device 102 can be configured to perform operations including authentication identification or a payment function. The user device 102 enables inputs and information display for the user 110 using a preset standard interface conforming to the application protocol. In some implementations, the user device 102 processes an authentication request to verify a signature entered by the user 110 on the user device 102. The user device 102 can be configured to send the results of the authentication verification to the terminal device 104. The operations of the user device 102 are described in detail with reference to FIG. 3.

The terminal device 104 can include a computing device such as a desktop computer, laptop/notebook computer, smart phone, tablet computer, another computing device, or a combination of computing devices, including physical or virtual instances of the computing device, or a combination of physical or virtual instances of the computing device. The terminal device 104 can include a communication module and a processor. The communication module can include a scanner (for example, a camera), a radio frequency transceiver, a satellite receiver, a cellular network, a Bluetooth system, a Wi-Fi system (for example, 802.x), a cable modem, a DSL/dial-up interface, a private branch exchange (PBX) system, and/or appropriate combinations thereof. The communication module of the terminal device 104 enables data to be transmitted from the client device 102 to the server system 106. The processor of the terminal device 104 enables processing data, according to one or more functions of the application, as described in detail with reference to FIG. 3.

In some implementations, the server system 106 can be provided by a third-party service provider, which stores and provides access to financial and payment accounts. In the example depicted in FIG. 1, the server devices 112 are intended to represent various forms of servers including, but not limited to, a web server, an application server, a proxy server, a network server, or a server pool. In general, server systems accept requests for application services (such as, pre-loan application services, purchasing orders, or online banking services) and provides such services to any number of user devices (for example, the user device 102) over the network 108.

In accordance with implementations of the present disclosure, the server system 106 can host an authentication identification algorithm (for example, provided as one or more computer-executable programs executed by one or more computing devices) that applies one or more verification rules before completing the transaction or payment request. The server system 106 can send the result data to the user device 102 over the network 108 for display to the user 110. Implementations of the present disclosure function largely independently of the payment account type, and do not require any modification to the payment method. Implementations of the present disclosure also provide a back-end computing system with authentication identification results associated to a user at multiple points in time in order to support risk mitigations.

Figure 2:
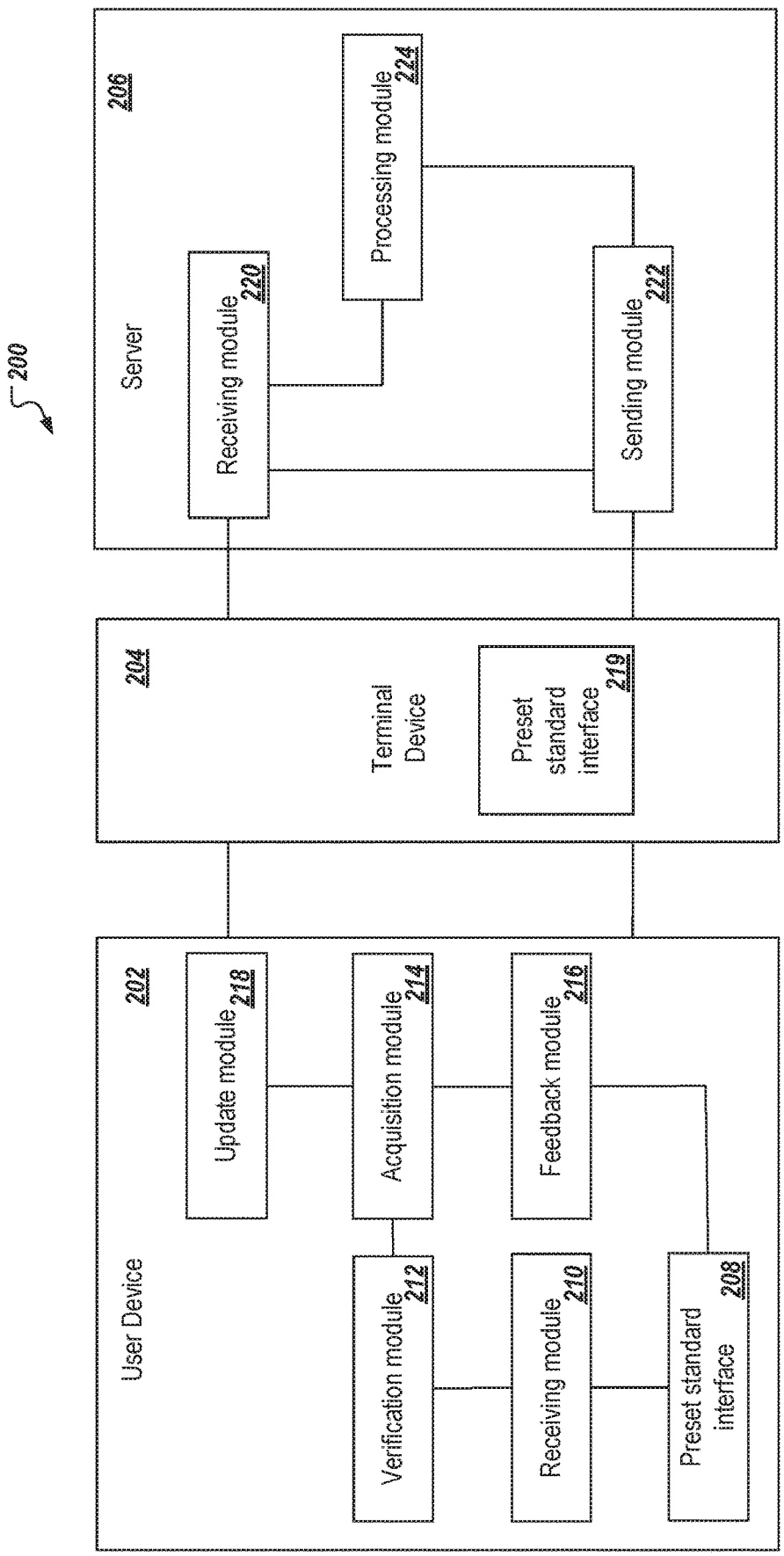
FIG. 2 is a block diagram illustrating an example of an architecture, according to an implementation of the present disclosure.

FIG. 2 illustrates an example of an architecture 200 that can be used to execute implementations of the present disclosure. In the depicted example, the example architecture 200 includes a user device 202 (for example, user device 102 described with reference to FIG. 1), a terminal device 204 (for example, terminal device 104 described with reference to FIG. 1), and a server 206 (for example, server system 106 described with reference to FIG. 1). The user device 202 includes a preset standard interface 208, a receiving unit 210, a verification module 212, an acquisition module 214, a feedback module 216, and an update module 218. The terminal device 204 includes a preset standard interface 219. The server 206 includes a receiving module 220, a sending module 222, and a processing module 216.

The preset standard interface 208 is configured to communicate with a service application of a particular type. The receiving module 210 is configured to receive, using the preset standard interface 208, an identity authentication request message sent by the server 206. The identity authentication request message can correspond to the service application.

The identity authentication request message is sent by the server 206 to a terminal device 204 after the server 206 receives the service request of the service application. The verification module 212 is configured to verify, according to a public key of the service application, a signature in the identity authentication request message. The acquisition module 214 is configured to acquire the service authentication information of an account corresponding to the identity authentication request message from service authentication information pre-stored in the terminal device 204. The feedback module 216 is configured to transmit a verification response message that includes the service authentication information acquired by the acquisition module 214 to the server 206 using the preset standard interface 208.

In some implementations, the receiving module 210 can receive, using the preset standard interface 208, a binding registration request message for an account that is sent by the service application. The verification module 212 can verify, according to the public key of the service application, a signature in the binding registration request message received by the receiving module 210. The acquisition module 214 can acquire, if the verification by the verification module 212 succeeds, service authentication information included in the binding registration request message. The acquisition module 214 can store the service authentication information and identity identification information of the account in the terminal device 204. The feedback module 216 can generate a registration response message according to identifier information of the terminal device 204. The feedback module 216 can transmit the registration response message to the service application using the preset standard interface 208.

The receiving module 210 is configured to receive, using the preset standard interface 208, a service authentication information update request message for an account that is sent by the service application. The verification module 212 is configured to verify, according to the public key of the service application, a signature in the service authentication information update request message received by the receiving module 210. If the verification succeeds, the verification module 212 is configured to determine whether identity identification information corresponding to service authentication information stored in the terminal device 204 is consistent with identity identification information transmitted in the service authentication information update request message. If the information matches, the acquisition module 214 is configured to acquire service authentication information included in the service authentication information update request message. The update module 218 is configured to determine whether a version information of the service authentication information acquired by the acquisition module 214 is higher than a version information of the current corresponding service authentication information locally stored in the terminal device 204. If the version is higher, the update module 218 is configured to update the corresponding service authentication information to be stored in the terminal device 204 with the service authentication information acquired by the acquisition module 214.

The receiving module 210 can receive, using the preset standard interface 208, an acknowledgment that the request is sent to the server 206 for further processing. The acquisition module 214 is configured to acquire acknowledgment manner type information included in the acknowledgment request, so that the terminal device 204 completes a corresponding acknowledgment operation according to the acknowledgment manner type information.

If an identity authentication request succeeds, the receiving module 220 is configured to receive, a verification response message including information from the user device 202 that is transmitted by the terminal device 204. The receiving module 220 can transmit the received information to the processing module 224. The processing module 224 is configured to process the service request according to the service authentication message received by the receiving module 220 and transmit the results to the sending module 222. The sending module 222 is configured to send, if a service request of the service application is received, an identity authentication request message to a terminal device 204 using a preset standard interface 219 included in the terminal device 204.

In some implementations, the sending module 222 is configured to send a binding registration request message for an account to the terminal device 204 using the preset standard interface 219 of the terminal device 204, wherein the binding registration request message includes service authentication information of the account. The receiving module 220 is configured to receive, if registration binding succeeds, a registration response message that is transmitted by the terminal device 204, and acknowledge that the terminal device 204 is successfully bound to the account, wherein the registration response message includes identifier information of the terminal device 204.

If the service authentication information of the account needs to be updated, the sending module 222 is configured to send a service authentication information update request message for the account to the terminal device 204 using the preset standard interface 219 of the terminal device 204. The service authentication information update request message includes the service authentication information to be updated in the account. After the processing module 224 completes processing of the service request, an acknowledgment request including acknowledgment manner type information is sent by the sending module 222 to the terminal device 204. The terminal device 204 completes a corresponding acknowledgment operation and transmits the acknowledgment for display on the preset standard interface 208 of the user device 202.

Within a context example, the user device 202 can be a wearable device that is configured to perform a payment function. For example, the user device 202 can be a smart watch, a smart badge, or smart glasses. The user device 202 has a payment function in itself, or an application having a payment function is installed thereon, and therefore, a corresponding payment operation can be performed for an associated account. The user device 202 communicates, using a preset standard interface, with a server of a payment type application and a payment-enabled terminal on which the payment type application is installed, wherein the preset standard interface may be a standard interface conforming to a payment protocol. In the technical solutions proposed in the present application, the user device 202 stores key verification information (that is, the service authentication information), and transmits back the verification information to the payment server in response to verifying that the identity is legitimate, to complete the payment operation.

Within the context example, the terminal device 204 can be a payment-enabled terminal. For example, the terminal device 204 can be a smart phone or a smart tablet computer (Pad) that includes a payment function, or an application having a payment function is installed thereon. The terminal device 204 is associated with a same user account as the wearable device. As required or set by a user, the terminal device 204 can acknowledge a payment operation by using the wearable device. The terminal device 204 can communicate with the user device 202 and the server 206 using a preset standard interface. The preset standard interface may be a standard interface conforming to a payment protocol.

Within the context example, the server 206 can be a payment server. For example, the server 206 is a server configured to perform payment processing and verification operations. The server 206 performs the payment operation if the verification succeeds.

Based on the system architecture 200, the preset standard interfaces 208, 219 may be configured according to a corresponding protocol. Within the context example proposed in the implementations of the present application, the interfaces 208, 219 may be configured by using, for example, a content protocol. The content protocol can include an ATT format configuration protocol standard, and UUID is used to identify a unique particular type attribute. For a specific identity authentication process, a protocol of the preset standard interface may be configured as including one service and four characteristics. The service can be UUID: 0x0001000 (for determining a particular type of a corresponding service application). The four characteristics can include registration, verification, key update, and acknowledgment (vibration). Corresponding characteristic UUIDs are: 0x00000011, 0x00000012, 0x00000013, and 0x00000014, so that function differences between specific interfaces can be identified.

Figure 3:
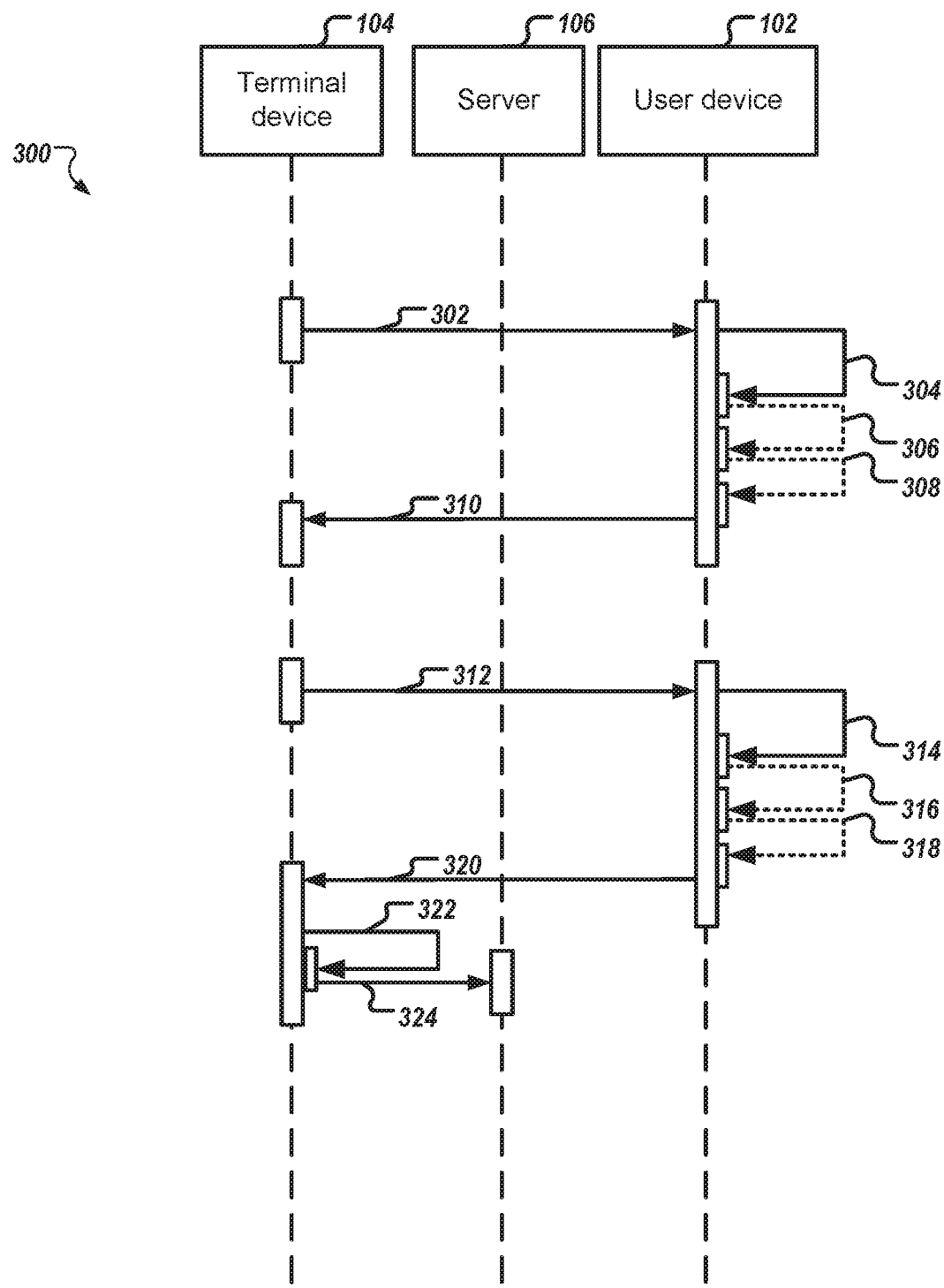
FIG. 3 depicts an example of a sequence diagram, according to an implementation of the present disclosure.

FIG. 3 depicts an example of a sequence diagram 300 in accordance with implementations of the present disclosure. As shown in FIG. 3, components of the example architecture 300 include the user device 102, the terminal device 104 and the server 106 described with reference to FIG. 1. In accordance with implementations of the present disclosure, the example sequence of the sequence diagram 300 performs operations that enable an authentication information. In some implementations, the sequence diagram 300 can be initiated by the user device 102.

In the sequence diagram 300 shown in FIG. 3, at 302, the user device 102 receives a registration request from the user using the preset standard interface. In some implementations, if an account identity verification based on a network side is required, the foregoing registration process may be triggered by using the payment server. If local identification information (for example, local key negotiation) matching is performed, a payment type service application on the payment-enabled terminal may directly initiate the registration process to the wearable device. Independent of the initiation manner, if the processed service is a payment service type, all operations are completed using the preset standard interface. The interference from another type of service message can be blocked by filtering data unrelated to the identity verification based on data format, and the security of a service operation of the current type can be improved. A final objective of the sequence diagram 300 is to identify and synchronously store verification information (such as, the service authentication information).

In some implementations, the payment type service application of the terminal device generates a trigger to initiate the registration process on the wearable device. The payment type service application on the payment-enabled terminal can transmit the verification information to the server. Independent of which processing solution is implemented, considering that the binding is effective for the respective payment account, a difference between specific trigger forms is omitted in a subsequent process, and the payment type service application of the payment account is directly used as a trigger entity to perform a corresponding binding operation. From 302, sequence diagram 300 proceeds to 304.

At 304, the wearable device parses the registration request according to a preset data format standard, to acquire information included therein. The payment type service application initiates the registration request to the preset standard interface of the wearable device. For example, for the binding process directly initiated by the payment type application on the payment-enabled terminal, the registration request may be directly transmitted by means of Bluetooth. For the binding process initiated by using the payment server, the registration request may be transmitted to the preset standard interface of the wearable device by using the payment server. After receiving the data, the wearable device performs deserialization (for example, a parsing operation) according to a preset data transmission format, to obtain verification information included in the registration request. The registration request and another message that is sent to the preset standard interface hereinafter are used to complete a corresponding legitimacy verification operation. The registration request can include the verification type information and specific signature information, which are key verification information.

Within a context example, the verification information type can be associated to two verification solutions that are available to the wearable device. One of the verification solutions is a relatively secure solution, in which RSA is adopted for encryption and signature verification. The other verification solution does not have high programming performance and has relatively low security, in which symmetric encryption is adopted.

The signature information can be generated according to a specific signature algorithm. Other messages can be generated according to a specific signature algorithm by using information that can be separately included therein. For example, signature algorithm types include sha256 and rsawithsha256. In some implementations, in addition to the key verification information, the registration request can include several parts of content.

The type of information included in the registration request does not affect the protection scope of the present application. Packet-related information is used to identify the registration request, and includes: a length of signed data and the signed data. Identity-related information is used to verify legitimacy of the registration request, and includes: signature information (that is, the identity identification information) of the payment service, length information of the signature information of the payment service, challenge information, and length information of the challenge information. Algorithm-related information is used to parse or generate a signature, and includes signature algorithm type information and length information of the signature algorithm. In addition, it should be noted that, in the implementation, the signature algorithm may be a Secure Hash Algorithm SHA 256 or a non-symmetric hash algorithm RSA with SHA 256, or any the signature algorithm. Payment-credential-related information is used to verify a payment operation in a subsequent process, and includes: a shared key (that is, the payment credential information) generated by the payment-enabled terminal and used to support the payment server to complete a fee deduction operation, and length information of the shared key. From 304, sequence diagram 300 proceeds to 306.

At 306, the wearable device verifies legitimacy of the registration request. In some implementations, after the information deserialization operation succeeds, the wearable device performs a verification operation according to the preset verification information. The wearable device may perform, according to a built-in public key for the payment service, a verification operation on the signature-related information that is obtained after the deserialization operation. From 306, if verification succeeds, sequence diagram 300 proceeds to 308. If verification fails, the wearable device determines that the registration request is invalid or illegitimate, and directly discards the registration request.

At 308, the wearable device performs, according to a built-in private key, a decryption operation on the payment-credential-related information that is obtained after the deserialization operation is performed, to acquire the payment credential information. The wearable device acquires device-identifier-related information that is obtained after the deserialization operation is performed. The wearable device locally stores the acquired payment credential information and identity identification information, for example, stores the information in a local Read-Only Memory (ROM). The storage for the binding relationship has been completed on the wearable device side, and in a subsequent operation, a binding status needs to be fed back to the payment type service application on the peer payment-enabled terminal. The binding operation can be completed after the binding relationship is successfully processed on both sides. From 308, sequence diagram 300 proceeds to 310.

At 310, the wearable device transmits identity identification information and other binding-related information according to a preset feedback rule. The wearable device generates a corresponding registration response message according to the preset feedback information assembly rule by using a unique ID (the identity identification information), a device model, and other information, and sends the registration response message to a registration request sender. If the payment-enabled terminal initiates the registration request, the registration response message is sent back to the payment-enabled terminal. If the registration request is initiated by using the payment server on the network side, the registration response message is sent back to the payment server, and the payment server performs a subsequent binding acknowledgment feedback. The encryption/decryption operations can increase the security of the process.

In addition to the key verification information, the registration response message may include the following several parts of content, on the precondition that the registration binding operation can be implemented. The type of information included in the registration response message does not affect the protection scope of the present application:

(1) Packet-related information is used to identify the registration request, and includes: a length of signed data and the signed data.

(2) Identity-related information is used to verify legitimacy of the registration request, and includes: signature information (that is, the identity identification information) of the payment service, length information of the signature information of the payment service, challenge information, and length information of the challenge information.

(3) Algorithm-related information is information used to parse or generate a signature, and includes: signature algorithm type information and length information of the signature algorithm. The signature algorithm may be SHA256 or RSA with SHA 256. In a specific environment, the signature algorithm may also be another signature algorithm.

(4) Wearable-device-related information is used to enable the registration initiator to acquire a successfully registered wearable device, and includes: unique ID information of the wearable device, length information of the unique ID information, device model information, and length information of the device model information.

By means of the foregoing processing, the wearable device can successfully store the payment authentication information and the identity identification information of an account of the payment type service application that is bound to the wearable device. Considering that a user may change payment credential information (for example, a payment password, a payment gesture, or the like), currently stored information may be updated subsequently by using the following procedure. For a specific update operation, reference may be made to the registration process above. In some implementations, before the payment authentication information is updated, an identity identification information comparison process is performed to determine that it is an update operation of the same user. The comparison can include a payment authentication information version comparison to determine whether a payment authentication information of a higher version is stored or not. In some implementations, the sequence 300 proceeds from the identity authentication to payment authentication. The user device performs core processing of the technical solutions proposed in the present application. For example, the user device performs an authentication operation on a payment request process, and in response to a successful authentication operation, the sequence diagram 300 is allowed to continue. From 310, sequence diagram 300 proceeds to 312.

At 312, the device receives, using the preset standard interface, a payment authentication request sent by the payment server. In some implementations, a payment operation is generally initiated by the payment-enabled terminal, wherein the payment-enabled terminal sends a payment request to the payment server, to request the payment operation. After receiving the payment request, the payment server triggers a payment authentication process, and sends the payment authentication request to the wearable device. The payment authentication request may be received using the preset standard interface of the wearable device. From 312, sequence diagram 300 proceeds to 314.

At 314, the wearable device parses the payment authentication request according to a preset data format standard, to acquire information included therein. If the payment type service application receives a payment process initiated by a user, the payment type service application initiates the payment authentication request to the preset standard interface of the wearable device. After receiving the data, the wearable device performs deserialization processing according to a preset data transmission format, to obtain verification information included in the payment authentication request. In some implementations, in addition to the key verification information, the payment authentication request may include the following several types of information. Packet-related information is used to identify the payment authentication request, and includes: a length of signed data and the signed data. Identity-related information is used to verify matching between the payment authentication request and the account bound to the wearable device, and includes: signature information (that is, the identity identification information) of the payment service, length information of the signature information of the payment service, challenge information, and length information of the challenge information. Algorithm-related information is used to parse or generate a signature, and includes: signature algorithm type information and length information of the signature algorithm. The signature algorithm may be SHA256 or RSAwithSHA256. In a specific environment, the signature algorithm may also be another signature algorithm, and details are not described here. From 314, sequence diagram 300 proceeds to 316.

At 316, the wearable device verifies a binding relationship between an account corresponding to the payment authentication request and an account corresponding to locally stored payment credential information. In some implementations, the wearable device needs to compare the information obtained by deserialization with the local information, to determine whether an account of a payment type service application corresponding to the payment authentication request is an account of the payment type service application bound to the wearable device. In some implementations, it may be verified whether identity identification information included in the message matches identity identification information corresponding to the locally stored payment credential information. From 316, if verification succeeds, sequence diagram 300 proceeds to 318. If verification fails, the wearable device determines that the registration request is invalid or illegitimate, and therefore directly discards the registration request.

At 318, the wearable device generates an identity key according to stored payment credential information of the payment-enabled terminal. The identity key is generated by using the payment credential information stored in the ROM in the preceding binding process. In some implementations, the identity key may be encrypted by using a public key of the payment type service application, and data is serialized according to an authentication output parameter, to generate feedback data (that is, the response data packet) that can be fed back. In addition to the key verification information, the feedback data may include the following several types of information:

(1) Packet-related information is used to identify the feedback data, and includes: a length of signed data and the signed data.

(2) Identity-related information is used to verify legitimacy of the feedback data, and includes: signature information (that is, the identity identification information) of the payment service, length information of the signature information of the payment service, challenge information, and length information of the challenge information.

(3) Algorithm-related information is used to parse or generate a signature, and includes: signature algorithm type information and length information of the signature algorithm. The signature algorithm may be SHA256 or RSA with SHA 256. In a specific environment, the signature algorithm may also be another signature algorithm, and details are not described here.

(4) Payment-credential-related information is used to enable the verification initiator to acquire the payment credential information, and includes: a length of an identity string obtained by encrypting the payment credential information that is permanently stored in the local ROM during binding, and identity string data. From 318, sequence diagram 300 proceeds to 320.

At 320, the wearable device sends feedback data according to a preset feedback rule, so that the payment server completes a fee deduction operation. From 320, sequence diagram 300 proceeds to 322.

At 322, after receiving the feedback data, the payment server obtains the payment credential information by decryption, to complete a subsequent fee deduction operation. The encryption/decryption operations can increase the security of information transmission. From 322, sequence diagram 300 proceeds to 324.

At 324, the user device transmits an acknowledgment response to the user according to a payment process operation result that is sent back by the payment server. The user device 102 receives, using the preset standard interface, an acknowledgment request sent from the (payment) server 106. The user device 102 acquires acknowledgment type information included in the acknowledgment request. The wearable device completes a corresponding acknowledgment operation according to the acknowledgment information type. For example, the acknowledgment information type can include any one or any combination of the following acknowledgment alerts: text acknowledgment, sound acknowledgment, and haptic acknowledgment. Correspondingly, for example, the text acknowledgment may display a string of characters, such as "your payment succeeded" on the display screen of the user device. The sound acknowledgment may be emitting a preset "ringtone". The haptic acknowledgment may be vibrating for a preset number of times or a continuous period of time. The acknowledgment operation is mainly performed to enable the user to be informed about the payment result. In some implementations, an alert is generated if the payment operation did not succeed. Such setting may be adjusted according to an actual need (for example, by the user of the user device), and does not affect the protection scope of the present application. After 324, sequence diagram 300 stops.

Figure 4:
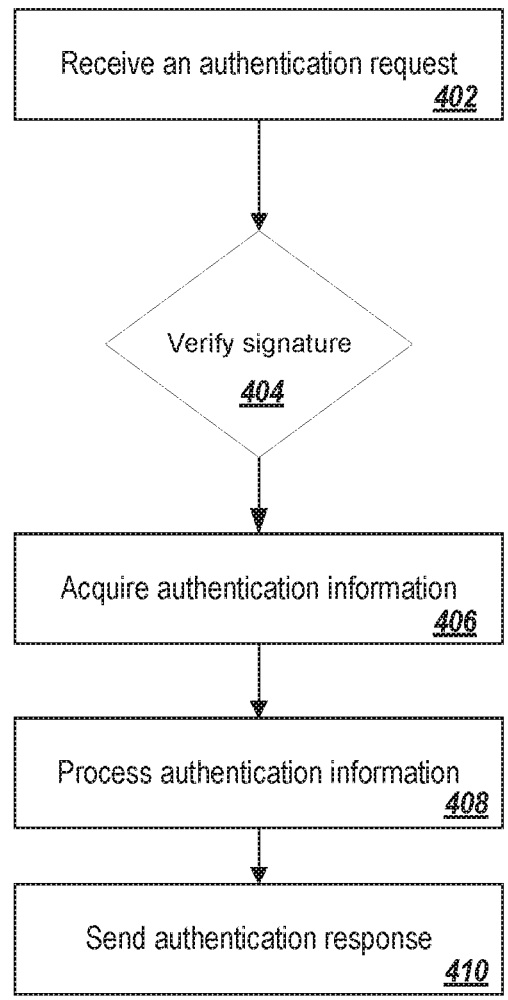
FIG. 4 is a flowchart illustrating examples of methods for performing a service operation, according to an implementation of the present disclosure.

FIG. 4 is a flowchart illustrating an example of a method 400 for performing an authentication with a wearable user device (for example, user device 102 described with reference to FIG. 1 or a user device 202 described with respect to FIG. 2), a terminal device (for example, terminal device 104 described with reference to FIG. 1 or terminal device 204 described with respect to FIG. 2), and a server (for example, server system 106 described with reference to FIG. 1 or server 206 described with respect to FIG. 2), according to an implementation of the present disclosure. Method 400 can be implemented as one or more computer-executable programs executed using one or more computing devices, as described with reference to FIGS. 1-3 and 5. In some implementations, various steps of the example method 400 can be run in parallel, in combination, in loops, or in any order.

At 402, the wearable device receives, using the preset standard interface, an identity authentication request message sent by the server corresponding to the service application. The identity authentication request message is sent by the server to the wearable device after the server receives a service request of the service application. In some implementations, the service application, as described herein, primarily refers to a service application type that matches a selected preset standard interface of the wearable device.

The service application includes an identity authentication operation during service execution. The message generated by a service application matches the format type transmitted by the preset standard interface. Format matching can effectively filter out an information exchange process of a service application from another type. Format matching can prevent other information from interfering with an information exchange process of the service application. Format matching can also improve corresponding information processing efficiency, while reducing computing resources by minimizing the amount of transmitted data. Additionally, format matching can also effectively shield the system from incoming attacks using forged packets imitating the preset standard interface, improving the security of an identity authentication process. In some implementations, for security reasons and before the identity authentication process is completed, the wearable device blocks any additional message sent by another service application of the wearable device. By blocking additional incoming messages, information filtering in the identity authentication process can be implemented, interference from another message or another user device can be avoided, and the security of the identity authentication process can be improved. From 402, method 400 proceeds to 404.

At 404, the wearable device verifies a signature in the identity authentication request message according to a public key of the service application. If verification succeeds, it can be considered that the identity authentication request message is a legitimate message sent by the service application, and is secure, and, from 404, method 400 proceeds to 406. If verification fails, it can be considered that the identity authentication request message is not a legitimate message sent by the service application, and therefore the identity authentication request message is directly discarded.

At 406, the wearable device acquires service authentication information of an account corresponding to the identity authentication request message from a locally pre-stored service authentication information database. The operation process of locally pre-storing service authentication information by the wearable device includes receiving, by the wearable device using the preset standard interface, a binding registration request message for an account that is sent by the service application.

The wearable device verifies legitimacy of the binding registration request message. For example, the wearable device verifies a signature in the binding registration request message according to the public key of the service application. If verification succeeds, the wearable device acquires service authentication information included in the binding registration request message. The acquired service authentication information and identity identification information of the account are stored by the wearable device in a local database for subsequent authentication operation. The identity identification information is used to indicate the account to which the service authentication information belongs. If identity identification verification succeeds, method 400 proceeds from 406 to 408. If verification fails, it can be considered that the binding registration request message is not a legitimate message sent by the service application, and is invalid, and therefore the binding registration request message is directly discarded.

At 408, after acquiring the service authentication information and the identity identification information, the wearable device processes the information to generate a registration response message according to identifier information of the wearable device. The registration response message is sent to the service application using the preset standard interface.

In some implementations, the registration response message includes an update message that can initiate an updating procedure. Considering that a user account may change service authentication information (for example, a payment password, a payment gesture, or the like), currently stored information may be subsequently updated by using an updating procedure. To initiate the updating procedure, the wearable device receives, using the preset standard interface, a service authentication information update request message for an account that is sent by the service application.

The wearable device verifies a signature in the service authentication information update request message according to the public key of the service application. If verification fails, it can be considered that the service authentication information update request message is not a legitimate message sent by the service application, and is invalid, and therefore the service authentication information update request message is directly discarded. If verification succeeds, the wearable device determines whether identity identification information corresponding to locally stored service authentication information is consistent with identity identification information included in the service authentication information update request message. If the service authentication is consistent, it can be determined that service authentication information of the same account has been stored in the wearable device, which matches the service authentication information update request message, and a subsequent operation is enabled. The wearable device acquires, service authentication information included in the service authentication information update request message. On the contrary, if the service authentication is inconsistent, it can be determined that service authentication information of the same account is not stored in the wearable device, which cannot match the service authentication information update request message, there is no object to be updated, and subsequent processing may be determined according to an actual need.

In some implementations, updating includes determining by the wearable device whether version information of the acquired service authentication information is higher than version information of the current locally stored corresponding service authentication information. By means of the step, it can be determined whether service authentication information currently stored in the wearable device needs to be updated. If a version update is available, the user device can receive a message from the wearable device to indicate that a version update is available for the local service authentication information application. The wearable device can automatically replace the currently stored corresponding service authentication information with the acquired service authentication information. If no newer version is available, the user device can receive a message from the wearable device to indicate that the version of the user device does not need to be updated, and the current update operation is terminated. From 408 method 400 proceeds to 410.

At 410, the wearable device transmits the verification response message to the server using the preset standard interface. In some implementations, to increase security, if payment credential information is transmitted, the service authentication information may be encrypted, and saved as a response data packet. After receiving the response data packet, the server obtains the service authentication information by decryption, so as to complete a subsequent service processing operation.

In some implementations, the verification response transmission can include a corresponding acknowledgment process. The acknowledgment process includes receiving, by the wearable device using the preset standard interface, an acknowledgment request that is sent by the server corresponding to the service application. The wearable device can acquire acknowledgment manner type information included in the acknowledgment request. The wearable device can compete a corresponding acknowledgment operation according to the acknowledgment manner type information. The acknowledgment manner type information included in the acknowledgment request may include any one or any combination of a text acknowledgment, a sound acknowledgment, and a vibration acknowledgment.

Correspondingly, for example, the text acknowledgment may be directly displaying a line of characters "your payment succeeded," "service processing succeeded," or the like on a display screen of the wearable device. The sound acknowledgment may be emitting a preset "ringtone." The vibration acknowledgment may be vibrating for a preset number of times or a continuous period of time. The acknowledgment operation is mainly performed to inform the user about a service processing result. The settings of the wearable device can be configured and adjusted according to a user or vendor preference, and does not affect the protection scope of the present application. After 410, method 400 stops.

The foregoing description method 400 describes a solution implementation process on a wearable device side. Correspondingly, the implementations of the present application also propose a solution implementation procedure on a server side. The method 400 can be implemented to a server corresponding to a service application of a particular type, wherein the server communicates with a wearable device using a preset standard interface included in the wearable device. The server can receive a service request of the service application. The server sends an identity authentication request message to the wearable device using the preset standard interface included in the wearable device. If an identity authentication request succeeds, the server receives a verification response message that is transmitted by the wearable device using the preset standard interface and includes service authentication information. The server processes the service request according to the service authentication message. In some implementations, before the server receives the service request of the service application, a process of pre-storing service authentication information is included. The process of pre-storing service authentication information includes sending, by the server, a binding registration request message for an account to the wearable device using the preset standard interface included in the wearable device. The binding registration request message includes service authentication information of the account. If registration binding succeeds the server receives a registration response message that is transmitted by the wearable device using the preset standard interface. The server can acknowledge that the wearable device is successfully bound to the account. The registration response message includes an identifier information of the wearable device. The pre-storage process corresponds to the operation process of locally pre-storing service authentication information by the wearable device in step 406. If the service authentication information of the account needs to be updated, the server sends a service authentication information update request message for the account to the wearable device using the preset standard interface included in the wearable device. The service authentication information update request message includes the service authentication information available to be updated of the account. In some implementations, after the server processes the service request according to the service authentication message, a corresponding acknowledgment process may be included. The server sends an acknowledgment request including acknowledgment manner type information to the wearable device using the preset standard interface included in the wearable device. The wearable device can complete a corresponding acknowledgment operation according to the acknowledgment manner type information. Each message received by the wearable device using the preset standard interface can include at least operation type information and signature information of the message. The signature information needs to match the service application corresponding to the preset standard interface, and therefore can be verified according to the public key of the service application. If verification fails, the server can be determine that the current message does not match the particular type. Based on the matching results, an unrelated message can be filtered out, and the security can be improved.

The implementations of the present application disclose a method and a device for identity authentication, implemented to a system composed of a server and a wearable device including a preset standard interface configured to communicate with a service application of a particular type. By means of the technical solutions proposed in the present application, if an identity authentication operation is required, the server can request service authentication information of an account of the service application from the wearable device using the preset standard interface. The wearable device can perform security verification on the process according to a corresponding verification rule. The wearable device can transmit locally pre-stored service authentication information back to the server for subsequent processing in response to a successful verification. The security of an identity authentication process can be ensured by means of the preset standard interface bound to the service application and security verification of the wearable device. A user's sense of participation in the process can be enhanced by using the identity authentication information currently stored in the wearable device. If the user device is specifically a wearable device, a user's sense of participation in the identity authentication process can be enhanced, the security of the identity authentication process can be improved, and an identity authentication success rate can be increased, especially for a payment authentication process.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM and DVD-ROM disks. The processor and the memory can be supplemented by, or incorporated in, special purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors.

To provide for interaction with a user, embodiments of the subject matter described in this specification can be implemented on a computer having a display device, for example, a cathode ray tube (CRT) or liquid crystal display (LCD) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11 a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method;

a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for performing an identity authentication operation, implemented by a terminal device comprising a preset standard interface configured to communicate with a service application of a dedicated type, the method comprising:

receiving, by the preset standard interface, a binding registration request for an account that is sent by the service application of the dedicated type;

locally storing, by the terminal device, service authentication information retrieved from the binding registration request and identity identification information of the account;

retrieving, by the terminal device, unique identifier information and device model information of the terminal device;

assembling, by the terminal device, the unique identifier information and the device model information according to a data format specified by the service application of the dedicated type;

signing, by the terminal device, the assembled information using a local private key;

providing, by the terminal device, a registration response message according to the unique identifier information of the terminal device;

transmitting, by the terminal device to a server, the registration response message to the service application of the dedicated type via the preset standard interface;

receiving, by the terminal device via the preset standard interface, an identity authentication request sent by the server corresponding to the service application of the dedicated type, wherein the identity authentication request is sent by the server to the terminal device after the server receives a service request of the service application of the dedicated type;

performing, by the terminal device, a verification of a signature in the identity authentication request according to a public key of the service application of the dedicated type;

in response to the verification of the signature in the identity authentication request, retrieving, by the terminal device, the locally stored service authentication information; and transmitting, by the terminal device, a verification response message that comprises the retrieved service authentication information to the server via the preset standard interface.

2. The method according to claim 1, comprising:

receiving, by the terminal device via the preset standard interface, an acknowledgment request that is sent by the server corresponding to the service application of the dedicated type;

retrieving, by the terminal device, acknowledgment manner type information comprised in the acknowledgment request; and completing, by the terminal device, a corresponding acknowledgment operation according to the acknowledgment manner type information.

3. The method according to claim 1, wherein the preset standard interface is configured to prevent transmission of messages from other service applications to the terminal device.

4. The method according to claim 1, wherein transmitting, by the terminal device, the verification response message comprises:

encrypting the retrieved service authentication information;

saving the encrypted service authentication information as a response data packet; and returning the response data packet to the server for decryption.

5. The method according to claim 1, wherein the terminal device comprises a wearable device.

6. The method according to claim 1, wherein the service application comprises a payment type service application, and the dedicated type comprises a payment.

7. A method for performing an identify authentication operation implemented by a terminal device comprising a preset standard interface configured to communicate with a service application of a dedicated type, the method comprising:

receiving, by the preset standard interface, a binding registration request for an account that is sent by the service application of the dedicated type;

locally storing, by the terminal device, service authentication information retrieved from the binding registration request and identity identification information of the account;

receiving, via the preset standard interface, a service authentication information update request for the account, wherein the service authentication information update request is sent by the service application of the dedicated type;

performing, by the terminal device, a verification of a signature in the service authentication information update request according to a public key of the service application of the dedicated type;

in response to the verification of the signature in the service authentication information update request, determining, by the terminal device, whether the identity identification information corresponding to the locally stored service authentication information is consistent with identity identification information carried in the service authentication information update request;

in response to the determination that the identity identification information corresponding to the locally stored service authentication information is consistent with the identity identification information carried in the service authentication information update request, retrieving, by the terminal device, service authentication information included in the service authentication information update request;

determining, by the terminal device, whether version information of the retrieved service authentication information is higher than current version information of the locally stored service authentication information; and in response to the determination that the version information of the retrieved service authentication information is higher than the current version information, replacing, by the terminal device, the locally stored service authentication information with the retrieved service authentication information.

8. A terminal device, comprising:
a preset standard interface configured to communicate with a service application of a dedicated type, and
one or more computers, and one or more computer memory devices interoperably coupled with the one or more computers and having tangible, non-transitory, machine-readable media storing instructions that, when executed by the one or more computers, perform operations comprising:
receiving, via the preset standard interface, a binding registration request for an account that is sent by the service application of the dedicated type;
locally storing, service authentication information retrieved from the binding registration request and identity identification information of the account;
retrieving unique identifier information and device model information of the terminal device;
assembling the unique identifier information and the device model information according to a data format specified by the service application of the dedicated type;
signing the assembled information using a local private key;
providing a registration response message according to the unique identifier information of the terminal device;
transmitting the registration response message to the service application of the dedicated type via the preset standard interface;
receiving, via the preset standard interface, an identity authentication request sent by a server corresponding to the service application of the dedicated type, wherein the identity authentication request is sent by the server to the terminal device after the server receives a service request of the service application of the dedicated type;
performing a verification of a signature in the identity authentication request according to a public key of the service application of the dedicated type;
in response to the verification of the signature in the identity authentication request, retrieving the locally stored service authentication information; and
transmitting a verification response message that comprises the retrieved service authentication information to the server via the preset standard interface.

9. The terminal device according to claim 8, wherein the operations further comprise:
receiving, via the preset standard interface, an acknowledgment request that is sent by the server corresponding to the service application of the dedicated type;
retrieving acknowledgment manner type information comprised in the acknowledgment request; and
completing a corresponding acknowledgment operation according to the acknowledgment manner type information.

10. The terminal device according to claim 8, wherein the preset standard interface is configured to prevent transmission of messages from other service applications to the terminal device.

11. The terminal device according to claim 8, wherein transmitting the verification response message comprises:
encrypting the retrieved service authentication information;
saving the encrypted service authentication information as a response data packet; and
returning the response data packet to the server for decryption.

12. The terminal device according to claim 8, wherein the terminal device comprises a wearable device.

13. The terminal device according to claim 8, wherein the service application comprises a payment type service application, and the dedicated type comprises a payment.

14. A terminal device comprising:
a preset standard interface configured to communicate with a service application of a dedicated type, and
one or more computers, and one or more computer memory devices interoperably coupled with the one or more computers and having tangible, non-transitory, machine-readable media storing instructions that, when executed by the one or more computers, the operations comprising:
receiving, by the preset standard interface, a binding registration request for an account that is sent by the service application of the dedicated type;
locally storing, service authentication information retrieved from the binding registration request and identity identification information of the account;
receiving, via the preset standard interface, a service authentication information update request for the account, wherein the service authentication information update request is sent by the service application of the dedicated type;
performing a verification of a signature in the service authentication information update request according to a public key of the service application of the dedicated type;
in response to the verification of the signature in the service authentication information update request, determining whether the identity identification information corresponding to the locally stored service authentication information is consistent with identity identification information carried in the service authentication information update request;
in response to the determination that the identity identification information corresponding to the locally stored service authentication information is consistent with the identity identification information carried in the service authentication information update request, retrieving service authentication information included in the service authentication information update request;
determining whether version information of the retrieved service authentication information is higher than current version information of the locally stored service authentication information; and
in response to the determination that the version information of the retrieved service authentication information is higher than the current version information, replacing the locally stored service authentication information with the retrieved service authentication information.

* * * * *